US012387899B2

(12) United States Patent
Daniels et al.

(10) Patent No.: US 12,387,899 B2
(45) Date of Patent: Aug. 12, 2025

(54) PEBBLE BED BEAM CONVERTER

(71) Applicant: Northstar Medical Technologies, LLC, Beloit, WI (US)

(72) Inventors: Melissa Daniels, Sun Prairie, WI (US); Bryant Mueller, Madison, WI (US); Richard Sisson, Beloit, WI (US)

(73) Assignee: Northstar Medical Technologies LLC, Beloit, WI (US)

(*) Notice: Subject to any disclaimer, the term of this patent is extended or adjusted under 35 U.S.C. 154(b) by 221 days.

(21) Appl. No.: 18/232,967

(22) Filed: Aug. 11, 2023

(65) Prior Publication Data

US 2024/0055214 A1 Feb. 15, 2024

Related U.S. Application Data

(60) Provisional application No. 63/398,107, filed on Aug. 15, 2022.

(51) Int. Cl.
*H01J 35/12* (2006.01)

(52) U.S. Cl.
CPC .................................... *H01J 35/12* (2013.01)

(58) Field of Classification Search
CPC ....... H01J 35/12; H01J 2235/086; G21G 1/12
See application file for complete search history.

(56) References Cited

U.S. PATENT DOCUMENTS 5,268,942 A 12/1993 Newton et al.
6,185,277 B1 2/2001 Harding
2008/0240330 A1* 10/2008 Holden .................... G21G 1/12 376/190
2014/0029727 A1 1/2014 Ono
2015/0092924 A1 4/2015 Yun et al.
2021/0249214 A1 8/2021 Yamakata

FOREIGN PATENT DOCUMENTS

CN 105788695 B 4/2018
JP H10508950 A * 9/1998

OTHER PUBLICATIONS

International Search Report re application No. PCT/US2023/030061, dated Aug. 21, 2024.
Written Opinion re application No. PCT/US2023/030061, dated Aug. 21, 2024.
Werner, C.J. et al., "MCNP6.2 Release Notes," Los Alamos National Laboratory, report LA-UR-18-20808 (2018).
Diamond, W.T.etal, "Actinium-225 Production with an Electron Accelerator," Journal of Applied Physics, vol. 129, (2021). 104901. 10.1063/5.0043509. (37 pages).

* cited by examiner

*Primary Examiner* — Kiho Kim

(74) *Attorney, Agent, or Firm* — Husch Blackwell LLP

(57) ABSTRACT

A converter for converting an electron beam into photons is provided. The converter can include a plurality of spherical beads made of high atomic number (high-Z material) disposed within a coolant fluid. The converter can include an inlet and an outlet for the coolant fluid. The coolant fluid can flow in a opposite direction as a direction of an electron beam.

20 Claims, 8 Drawing Sheets

PEBBLE BED BEAM CONVERTER

CROSS-REFERENCE TO RELATED APPLICATIONS

This application claims the benefit of the filing date of U.S. provisional application Ser. No. 63/398,107, filed Aug. 15, 2022, entitled, "Pebble Bed Beam Converter," all of which is hereby incorporated by reference as if fully set forth herein.

FIELD OF THE INVENTION

This disclosure generally relates to a converter. Specifically, the disclosure relates to devices and apparatuses intended to produce high energy x-rays of a specific wavelength, intensity and duration from energetic electron beams, and more specifically, to a converter for generating a flux of high-energy photons from a high-energy electron beam.

BACKGROUND OF THE INVENTION

There is a need for a device to produce high energy x-rays from electron beams for radioisotope production. For example, the quest for bridging the gap between the severely constrained 225Ac supply and the large worldwide demand is a key factor in nuclear medicine. The demand for 225Ac stems from the use of that isotope in targeted alpha therapy (TAT). Radioisotope 225Ac and its daughter 213Bi are used in medicine for the treatment of prostate, brain, and neuroendocrine cancers. 213Bi has a half-life of about 45.61 months. However, 225Ac has a relatively short half-life (T½) of about 9.92 days. Thus, it can be difficult to maintain a supply of 225Ac because it quickly decays.

In usual production, 225Ac is produced via the $\beta^-$ decay of 225Ra, which is itself produced by the ($\gamma$,n) reaction on a high-purity 226Ra (T½=1600 years) target. The high-energy photons are produced by a converter of high atomic number (high-Z) material, such as tantalum, via the braking-radiation (bremsstrahlung) mechanism that can result from slowing down very energetic accelerated electrons impinging on the converter material.

However, most existing converters are limited in beam power acceptance by the need to extract the thermal power deposited within the converter at sufficiently low temperatures to maintain the converter material's mechanical integrity. For example, typical existing converters are often limited to accept beam powers of less than 50 kilowatts (kW), limiting the photon creation potential to be a fraction of what a high-power converter could produce. As accelerators become more capable of producing higher power, there is a need for a converter suitable to accept higher beam powers.

Conventionally, converters suitable for high power regimes (such as greater than 100 kW up to about 500 kW or more) are exceedingly rare and mechanically complex. For example, existing high-power converters can utilize large rotating surfaces to reduce time-averaged thermal power deposition at a location on the disk surface, heating a point on a disk for a small fraction of its rotation and allowing cooling for the remainder. However, these types of converters can suffer from catastrophic and run-away failures due to their mechanical intricacies. As such, there is a need for a thermally and mechanically reliable converter suitable for high beam power regime that has low reliance on supplemental mechanics such as a motor.

BRIEF SUMMARY OF THE INVENTION

An aspect of this disclosure pertains to a converter capable of generating a high-flux of high-energy photons (such as greater than 5 MeV) from an electron beam. In some embodiments, the electron beam can be greater or equal to 40 MeV, with an effective beam power of greater or equal to 125 kW. In some embodiments, the converter can be utilized in applications up to about 500 kW.

Another aspect of this disclosure pertains to a converter including a structured or unstructured lattice of high-Z material in geometries of small spheres, irregular particles, meshes, or other porous arrangements. The converter is configured to accept electron beam from a first side and to generate photon out a second side opposite from the first side, and to allow simultaneous coolant flow through the converter in a direction parallel or perpendicular to the electron beam. A variety of coolant can be used. The coolant can be fluid such as water or gaseous such as helium, or other suitable materials.

Yet another aspect of this disclosure pertains to providing a converter having a plurality of spherical beads disposed in a coolant fluid; bombarding the converter with electron beams from a first side of the converter; and generating photons out of a second side of the converter opposite from the first side.

A further aspect of this disclosure pertains to providing the coolant fluid to a converter parallel to the direction of the electron beam bombardment.

In one embodiment, a converter for an electron beam is provided. The converter comprising a plurality of spherical beads disposed in a coolant fluid within the converter, wherein the converter is configured to accept the electron beam from a first side and to generate photons out a second side opposite from the first side.

In one embodiment, the plurality of spherical beads are made of high atomic number (high-Z) material.

In one embodiment, the plurality of spherical beads are packed and pseudo-randomly distributed within the converter.

In one embodiment, the coolant fluid enters the converter from an inlet on the second side and exits the converter from an outlet on the first side.

In one embodiment, a first screen is provided over the inlet and a second screen is provided over the outlet such that the plurality of spherical beads is contained within the converter through the first screen and the second screen.

In one embodiment, a system for producing isotopes is provided. The system comprising an accelerator; a beamline; and a target system comprising: a porous media converter comprising a plurality of spherical beads; and a target; an inlet designed to permit a flow of a coolant fluid to enter the porous media converter and surround the plurality of spherical beads; and an outlet designed to permit the coolant fluid to flow out of the porous media converter.

In one embodiment the accelerator is placed on a common axis with the target system.

In one embodiment, the accelerator is placed on a first axis and the target system is placed on a second axis, different than the first axis.

In one embodiment, the system comprises a target cooling system in fluid communication with the target system.

In one embodiment, the system comprises a hot cell in fluid communication with the target system.

In one embodiment, the system comprises an accelerator vault designed to house the accelerator, the beamline, and the target system.

In one embodiment, the system comprise a first irradiation zone located in the accelerator vault, the first radiation zone designed to house the accelerator and the beamline.

In one embodiment, the system comprises a second irradiation zone located in the accelerator vault, the second irradiation zone designed to house the target system.

In one embodiment, the system comprises a beamline window positioned in front of the porous media converter.

In one embodiment, the system comprises a passage designed to form a fluid passage between the inlet and the outlet to form a flow loop.

In one embodiment, a method of converting an electron beam into a photon is provided. The method comprising the steps of: providing a converter having a plurality of spherical beads disposed in a coolant fluid; bombarding the converter with one or more electron beams from a first side of the converter; and generating photons out of a second side of the converter opposite from the first side.

In one embodiment, the method comprises the plurality of spherical beads as being made of high atomic number (high-Z) material.

In one embodiment, the method comprises spherical beads being tightly packed and pseudo-randomly distributed within the converter.

In one embodiment, the method comprises providing the coolant fluid into the converter from an inlet on the second side; and allowing the coolant fluid to exit the converter from an outlet on the first side.

In one embodiment, the method comprises providing a first screen over the inlet and a second screen provided over the outlet such that the plurality of spherical beads is contained within the converter through the first screen and the second screen.

Figure 1:
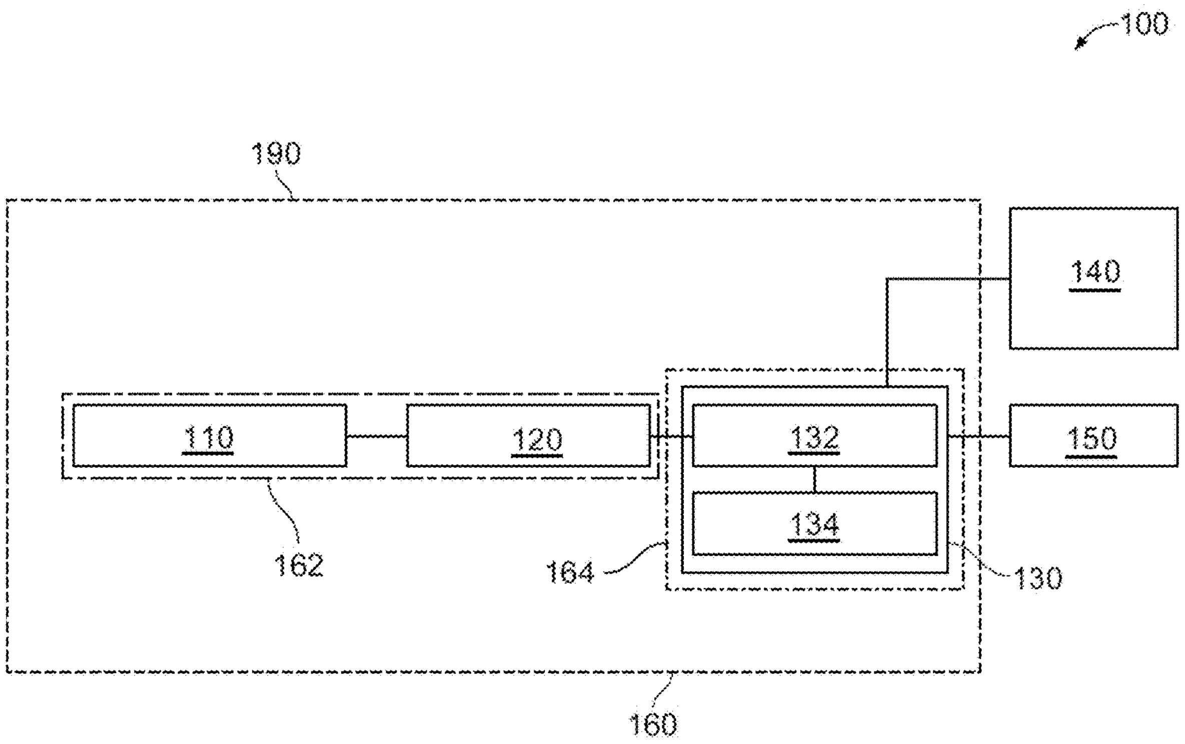
FIG. 1 illustrates a schematic depiction of an exemplary system 100 for producing an isotope such as 225Ac according to an example embodiment.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Although this invention is susceptible of embodiments in many different forms, that are shown in the drawings and will be described in detail herein in specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

Referring to FIG. 1, an exemplary system 100 for producing an isotope, particularly 225Ac, is shown. Specifically, the system 100 can comprise an accelerator 110 connected to a beamline 120. The beamline 120 can impact on a target system 130. The target system 130 can be an apparatus where a target isotope such as 226Ra is held for irradiation. The target system 130 can include a converter 132 and a target 134. The target system 130 can further engage with a target cooling system 140 (also known as a process cooling system) and a hot cell 150.

The accelerator 110, the beamline 120, and the target system 130 can be shielded within an accelerator vault 160. In an exemplary embodiment, the accelerator vault 160 can further be separated into a first radiation zone 162 that houses the accelerator 110 and the beamline 120 therein and a second radiation zone 164 that houses the target system 130.

In an exemplary embodiment, the accelerator vault 160 can include interior walls used to form the first radiation zone 162 and/or the second radiation zone 164. The accelerator vault 160, the interior walls, zones in the accelerator vault 160, and other building rooms can be constructed out of high-density (HD) concrete blocks, such as that supplied by Veritas Medical Solutions, Harleysville, PA, USA. HD concrete is better per unit volume at shielding gamma rays, which are the primary source of radiation created in the process, than regular density concrete.

Although other materials such as steel or lead can also be used for the accelerator vault, these materials are more expensive, and are not as efficient in stopping prompt neutrons, which are also produced during the process, as borated HD concrete. Specifically, prompt radiation refers to radiation emitted instantaneously during an operation of the accelerator 110, which is different from residual or induced radiation caused by activated components in the accelerator vault 160 or the beamline 120.

The accelerator 110 can generate accelerated electrons to irradiate 226Ra held in the target system 130. In an exemplary embodiment, the electron accelerator 110 is capable of supplying about 20 to about 250 kW of average power with about 25 to about 100 MeV electrons. Preferably the average power value is about 60 to about 200 kW, and more preferably about 80 to about 125 kW. Preferably, the electrons are at about 25 to about 55 MeV.

To irradiate the target system 130, a specialized beamline can be used to bend a respective electron beam at an angle toward the target system 130. In an exemplary embodiment, the beamline 120 bends the electron beam by 90 degrees toward the target system 130. The invention is not limited to 90 degrees but can include other angles to result in beamlines irradiating the target 134 from different directions or degrees. As a result, the target system 130 can be placed on a different axis than the accelerator 110. Instead, in an exemplary embodiment, accelerator 110 is offset from the target system 130 as shown in FIG. 1. Accelerator 110 can also be placed on a common axis with target system 130.

Further, a control system can be provided that integrates individual control systems of the accelerator 110, the beamline 120, the target cooling system 140, the hot cell 170, and other components of the system for producing a radioisotope such as 225Ac. For example, the combined control system can be used to time a production of beam pulses by the accelerator 110 such that the beam pulses arrive at the target 134.

In operation, the beamline 120 can accept the electron beam from the accelerator 110. Then the beamline 120 can bend the respective beam to hit the target system 130 to avoid backstreaming radiation. After the bend, the beamline 120 can aim the beam to a desired spot at the target system 130, analyze the energy of the beam, or pass the beam straight through to a waiting beam analyzer and dump.

According to an exemplary embodiment, a Rhodotron® electron beam (E-beam) accelerator, produced by IBA Industrial, Louvain-La-Neuve, Belgium, can be used as the accelerator 110. Unlike a conventional linear accelerator (linac), a Rhodotron® E-beam accelerator is a continuous wave electron beam accelerator combining high-power and high energy. The high-power high-energy property of a Rhodotron® E-beam accelerator helps to improve the production efficiency of 225Ac, previously unattainable using a linac. Moreover, a Rhodotron® E beam accelerator is more compact in size, allowing the accelerator setup to take up less square footage in an isotope production facility.

The preferred Rhodotron® E beam accelerator can provide an electron beam whose diameter is about 7 mm (Full Width at Half Max), about 12 mm FWHM, or about 25 mm FWHM. A Gaussian beam with 3 sigma of standard deviation corresponds to 8.9 mm and 15 mm of diameter, respectively. The accelerator's ability to operate at a larger FWHM decreases the maximum volumetric thermal power deposition into the converter 132 by distributing the energy of the beam over a larger volume of the converter material. The size of the target 134 can be about 25 mm in diameter, with about 0.060198 mm of thickness (RaBr2).

Figure 2:
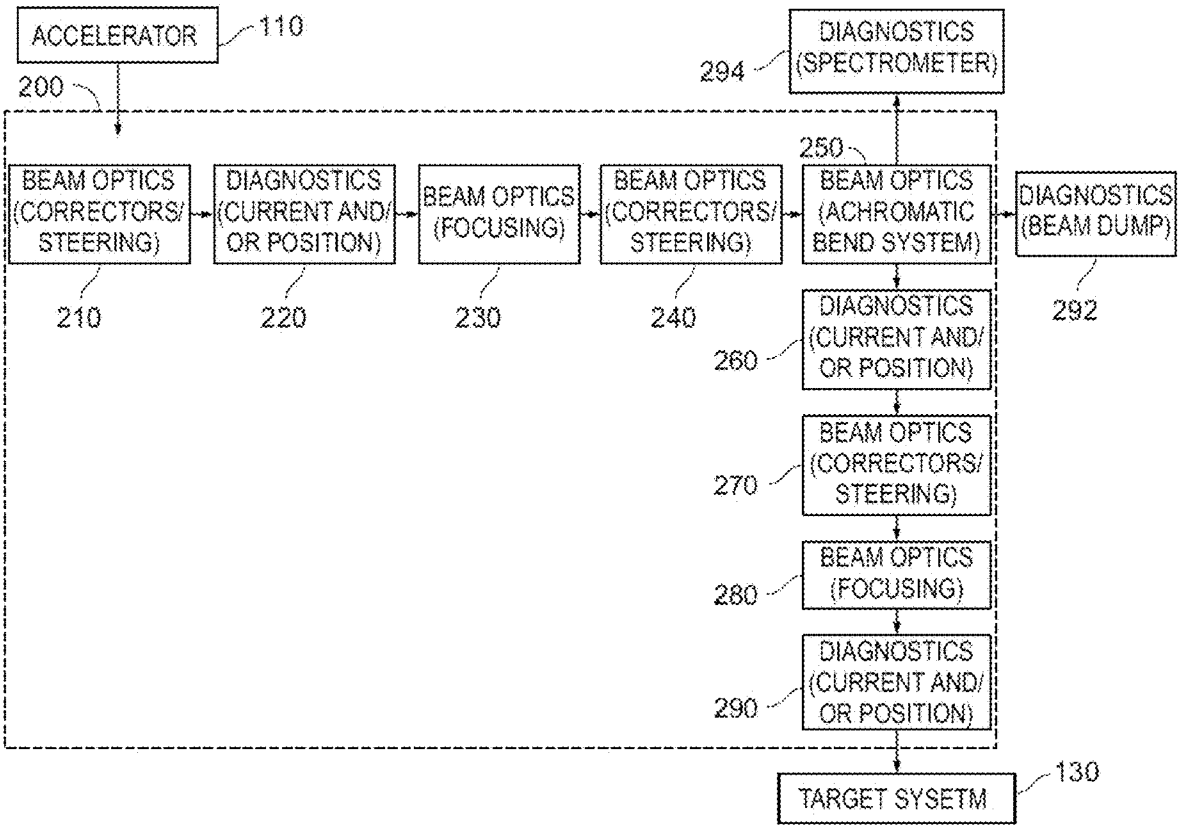
FIG. 2 illustrates a block diagram of a beamline according to an example embodiment.

FIG. 2 illustrates an example beamline 200. The beamline 200 can be the beamline 120 of FIG. 1. As shown, the beamline 200 can include a first beam optics 210 that accepts an electron beam from accelerator 110. The beam optics 210 can be used to correct and steer the electron beam received from the accelerator. The beam optics 210 can be coupled to a diagnostic component 220 that can be used to analyze a current or a position of the electron beam. The diagnostic component 220 can further be coupled with a second beam optics 230 used for focusing the electron beam. The second beam optics 230 can be coupled with a third beam optics 240 for further correcting and steering the electron beam. Therefrom, the third beam optics 240 can be coupled to a fourth beam optics 250 comprising an achromatic bend system. In an exemplary embodiment, to facilitate the bending of the electron beam, a pair of 270° magnets can be used for the achromatic bend system to bend the electron beam.

From the fourth beam optics 250, the electron beam can travel down one of three paths. If the electron beam matches a predetermined criteria for production, the electron beam can be bent by the fourth beam optic 250 toward a second diagnostic component 260 for further analysis of the current or the position of the electron beam. The second diagnostic component 260 can be coupled with a fifth beam optics 270 for correction and steer, which can further be coupled with a sixth beam optics 280 for focusing. The sixth beam optics 280 can be coupled to a third diagnostic component 290 for further current and position analysis of the electron beam before transporting the electron beam to a target (such as 226Ra housed in the target system 130 described above in reference to FIG. 1).

Alternatively, if the electron beam does not match the predetermined criteria for production, the fourth beam optics 250 can pass the electron beam to a fourth diagnostic component 292 and to a beam dump or beam stop. Lastly, if the electron beam is not used for production, the fourth beam optics 250 can pass the electron beam to a fifth diagnostic component 294 such as a spectrometer for further analyzing.

In an exemplary embodiment, the electron beam can enter the fourth beam optics 250 and exit the fourth beam optics 250 in substantially the same plane. That is to say, the achromatic bend system of the fourth beam optics 250 does not affect a vertical elevation of the electron beam. However, in other embodiments, the electron beam can exit the fourth beam optics 250 in a different plane than the plane at which the electron beam enters the fourth beam optics 250.

It can be appreciated that the beamline 200 can include other variations such as addition or omission of certain components. Such variations are within the spirit of this disclosure.

Figure 3:
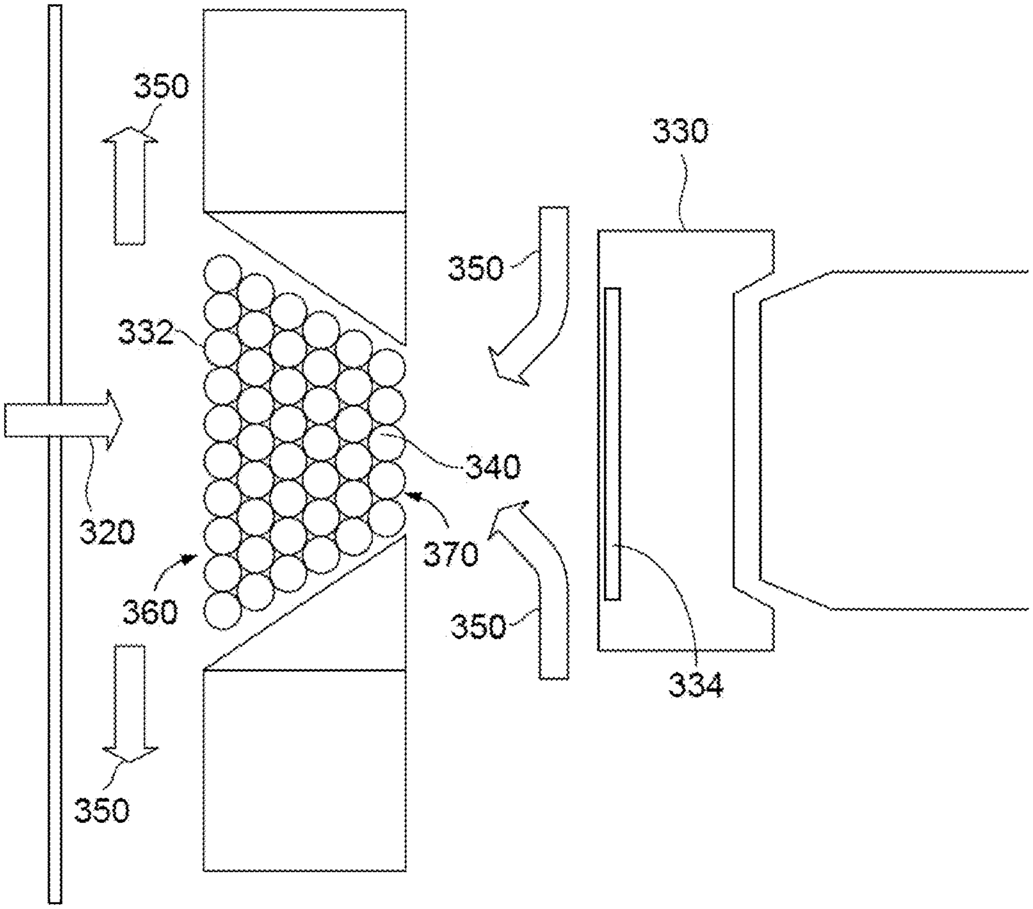
FIG. 3 illustrates a perspective view of a pebble bed converter according to an example embodiment.

FIG. 3 illustrates a beam converter system 300 suitable for high-power usage according to an example embodiment. The beam converter system 300 can include a converter 332, which can be the converter 132 of FIG. 1. The converter 332 can be positioned ahead of a target 334 in a target system 330 prior to a beamline 320 approaching the target 334. The beamline 320, the target system 330, and the target 334 can be the beamline 120, the target system 130, and the target 134 of FIG. 1, respectively.

Figure 4:
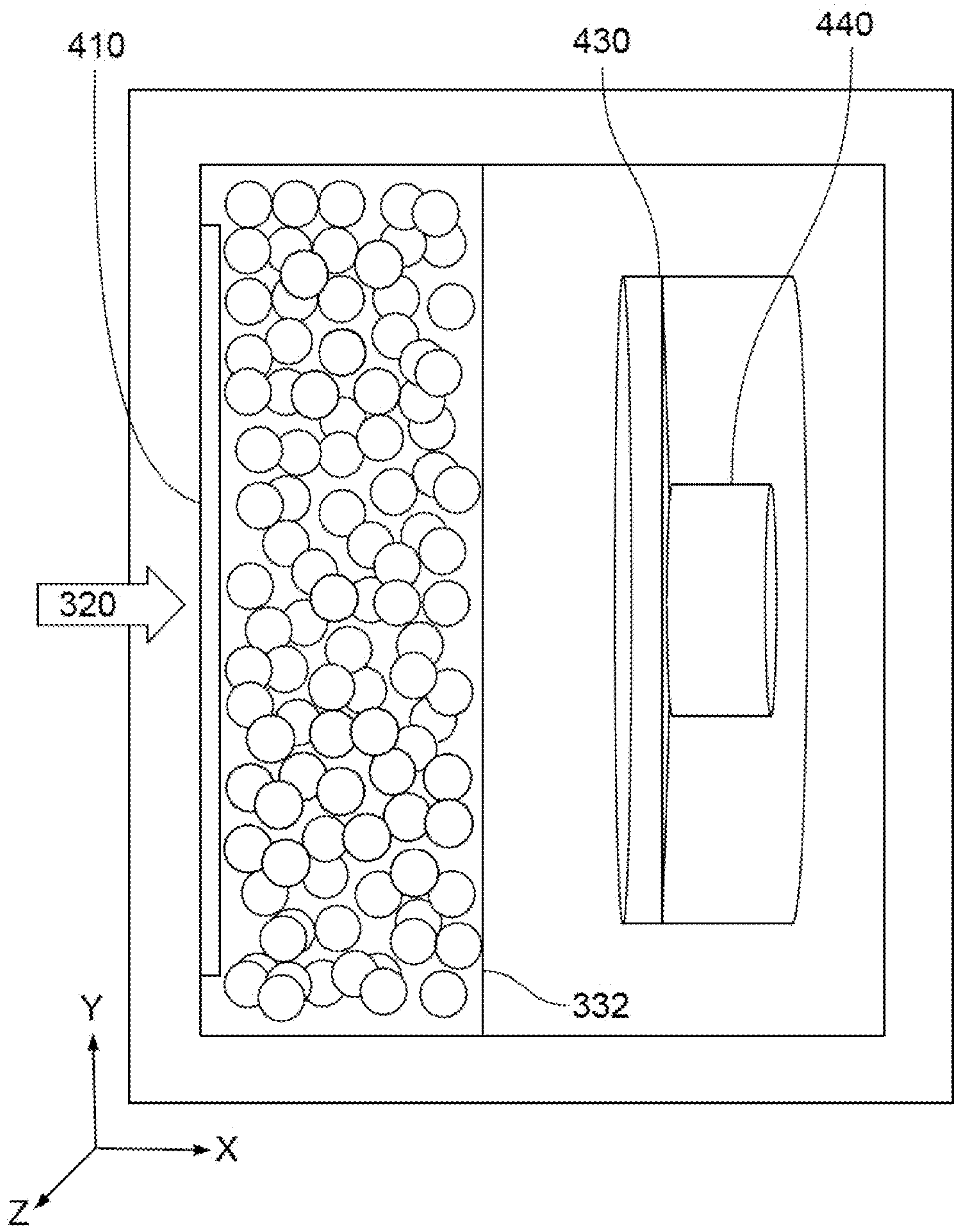
FIG. 4 illustrates a cross-sectional view of a pebble bed converter according to an example embodiment.

As shown in FIG. 3, the beam converter 332 can be configured as a volume of porous media 340 including a matrix of solid 'high-Z' beam converter material with a flowing coolant fluid 350. Alternatively or additionally, the converter 332 can also include a matrix of solid "medium-Z" material such as silver or copper. Many geometries for such matrix can be possible, such as packed irregular particles, structured woven meshes of wires, or unstructured 'wool'-like fibers. In an exemplary embodiment, randomly packed spherical beads can be used as shown in FIGS. 3 and 4.

In an example embodiment, the beads can be made out of a high-Z material such as tantalum, tungsten, gold, platinum, thorium, or other suitable materials. Other materials or compositions can also be utilized depending on the specific system requirements for coolant hydraulics, thermal power dissipation, mechanical strength, and photon yield of an implementing system. For example, gold-coated tungsten beads can be utilized for improved chemical compatibility with the water coolant, or lower-Z silver could be used to reduce local thermal power deposition. In some embodiments, the beads can have diameters less than about 2 millimeters (mm). In another embodiment, the diameters of the beads can be between about 0.1 mm and about 1 mm.

In some embodiments, the beads can be tightly packed and pseudo-randomly distributed. The beads can be contained in a "puck" with a diameter constrained by the FWHM (full width at half maximum) of the incident electron beam and a depth that correlates to the porosity and composition of the porous high-Z material. An encasement volume for the beads can be about 15 mm in diameter and about 9 mm in depth. The beads can be packed in place and secured at the flow inlet and flow exit by a fine woven stainless steel mesh with an opening size less than the converter sphere diameter.

The highly porous converter configuration can provide large convective heat transfer coefficients (at the interface to a water-based liquid or chemically inert gas coolant) and significant heat transfer surface area per unit converter volume for the converter material. This allows significantly higher volumetric thermal power deposition relative to non-porous converters constrained by equivalent material or thermal hydraulic properties such as converter material melting temperature, coolant boiling temperature, or critical boiling heat flux. Relative to a non-porous converter, a porous converter can therefore dissipate greater thermal power and high-efficiency photon generation. In some embodiments, the photon generation efficiency can be above 50% radiative power. More specifically, in some embodiments, the photon generation efficiency can be around 60% radiative power.

A coolant flow direction can be perpendicular or parallel to the electron beam. In some embodiments, porous media geometries, such as structured meshes, can allow the porosity of the media to be controlled independently of the solid feature size—using wire diameter and spacing. Such a configuration can increase heat transfer while minimizing coolant pressure drop.

A porous converter can operate at lower temperatures relative to conventional non-porous converter geometries due to its higher heat transfer coefficient and heat transfer surface area per unit volume, avoiding or minimizing thermal deformation of the converter material. Thermal deformations that do occur in a porous converter are less likely to incur thermal performance penalties than those occurring in a non-porous converter geometry. For instance, in a packed bed of spherical particles, individual spheres and the overall volume of the packed bed will expand as the temperature increases but the pores can remain open, allowing coolant to flow through the matrix of spheres in the expanded state.

In an example conventional converter, consisting of a set of solid parallel plates separated by cooling channels with the electron beam traveling perpendicular to the plate surface and coolant flow, buckling can occur as the electron beam produces a non-uniform temperature distribution in the plate, in turn changing the coolant channel geometry and potentially degrading the thermal performance of the overall converter structure.

Still referring to FIG. 3, the converter 332 can include an inlet 360 and an outlet 370. The inlet 360 and the outlet 370 can allow the coolant 350 to form a flow loop. As shown in FIG. 3, in an embodiment, the beamline 320 can be directed at the converter 332 from a first direction, and the coolant 350 can flow through the converter 332 from a second direction opposite the first direction. In addition, the target system 334 can be aligned with the beamline 320 and the converter 332 such that the beam 320 can be converted into bremsstrahlung through the converter 332 as it approaches the target 334.

As discussed above, in some embodiments, the porous media 340 can be allowed to expand and/or contract due to thermal expansion. In the case of porous media beads, the expansion and/or contraction of the beads can result in a slow migration of individual damaged beads as a consequence of the self-arranging phenomenon of the random spherical packing. In some embodiments, the beads can be held in place via fine screens of metal (such as stainless steel) placed over the inlet 360 and/or the outlet 370. In some embodiments, the porous material can be sintered together.

Now referring to FIG. 4, a pebble bed beam converter 400 is shown. The pebble bed beam converter 400 is similar to the beam converter system 300 of FIG. 3. However, here, the pebble bed beam converter 400 can include a beamline window 410 that can direct the beamline 320 towards the converter 332. Further, a target system 420 can include a target capture 430 and a target cavity 340.

Figure 5:
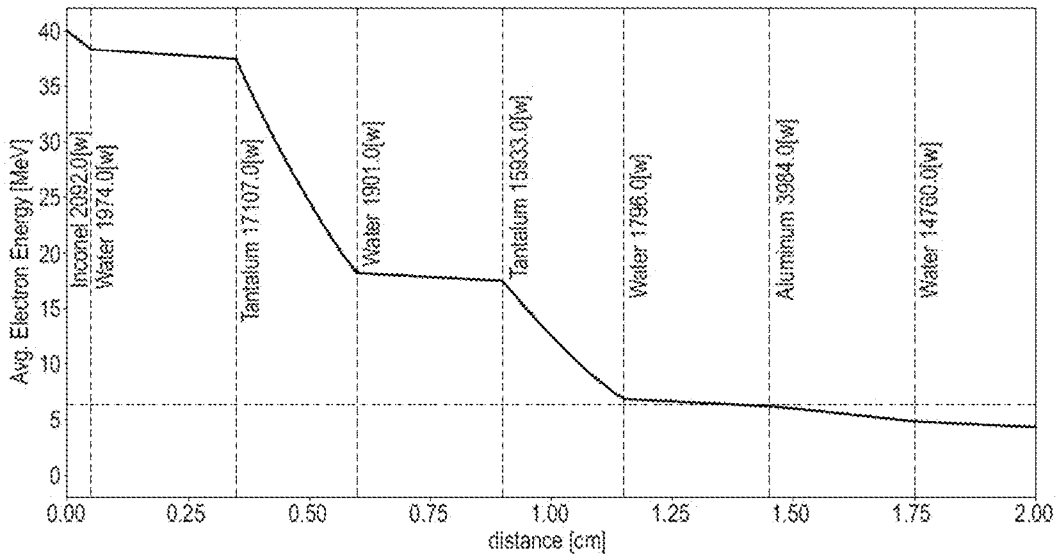
FIG. 5 illustrates a diagram of average electron energy loss through materials.

Now turning to FIG. 5, a diagram of average electron energy versus distance as an electron beam traverses through a series of coolant (such as water) and high-Z material (such as tantalum) is shown.

Figure 6:
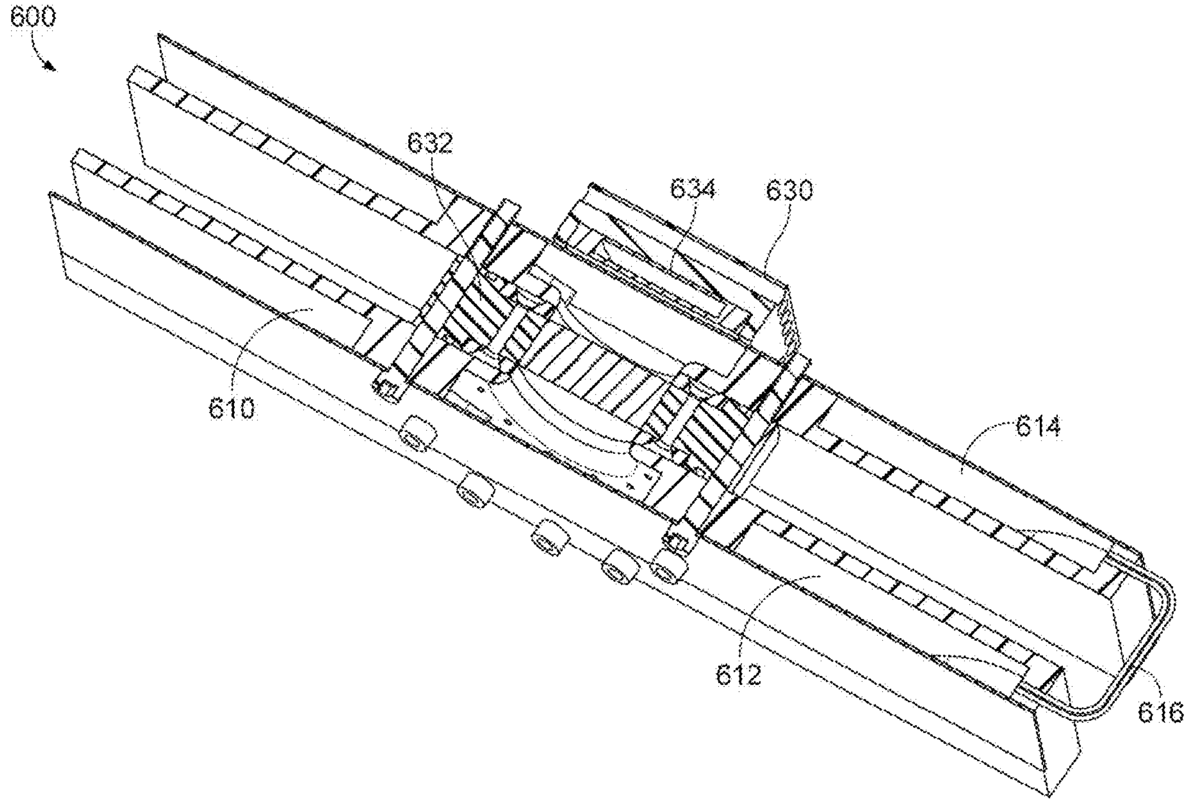
FIG. 6 illustrates a cross-sectional view of a target region according to an example embodiment.
Figure 7:
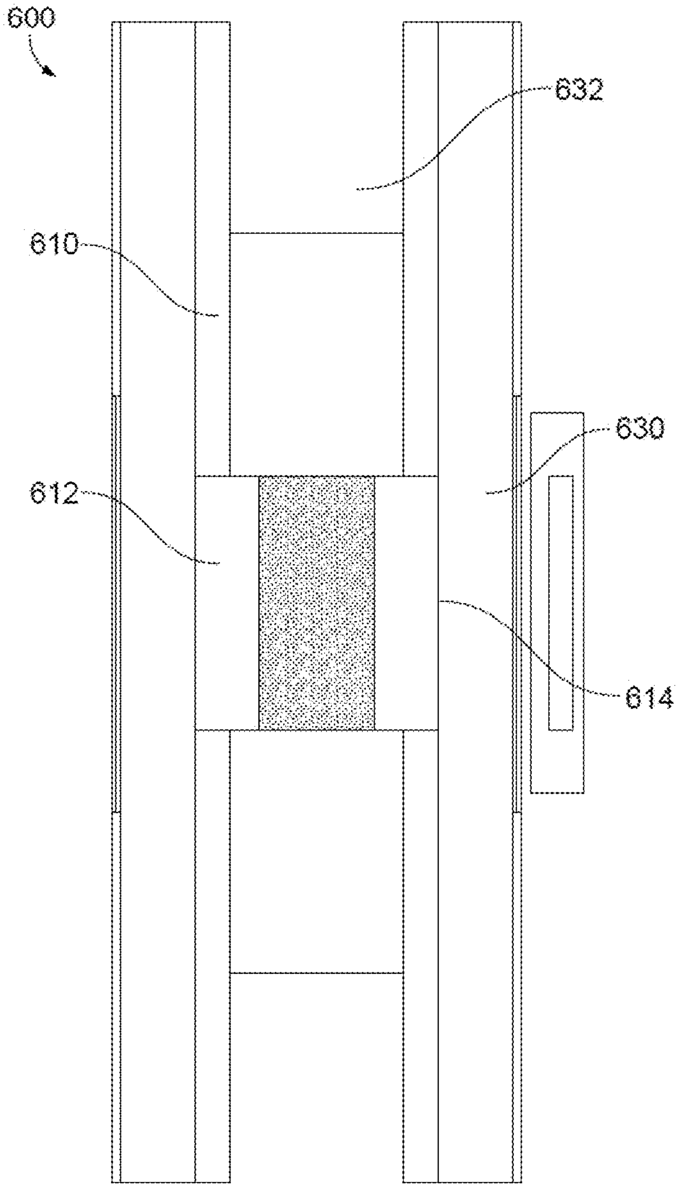
FIG. 7 illustrates another view of the target region of FIG. 6.

FIGS. 6 and 7 illustrate a target region 600. The target region 600 can include a target system 630 which contains a converter 632 and a target 634. In some embodiments, the target system 630, the converter 632, and the target 634 can be the target system 130, the converter 132, and the target 134 of FIG. 1, respectively. In some embodiments, the target system 630, the converter 632, and the target 634 can be the target system 330, the converter 332, and the target 334 of FIG. 3, respectively.

The target region 600 can also include a cooling system 610. The cooling system 610 can include an inlet coolant pipe 612 and an outlet coolant pipe 614. The inlet coolant pipe 610 and the outlet coolant pipe 614 can be connected via a passage 616 to form a flow loop.

In embodiments utilizing a parallel flow of coolants, a flow loop with inlet and outlet streams can be provided such that the inlet stream and the outlet stream are perpendicular to the beam with the pass-through directed through the converter 632. In some embodiments, a second pass-through between the inlet coolant pipe 612 and outlet coolant pipe 614 can be provided past the converter 632 to cause the coolant to continue to be driven forward as well as through the converter 632.

The secondary pass through can be restricted, for example, by decreasing the cross-sectional area of the channel by adding an in-line adjustable valve. Such a configuration can prevent recirculation zones within the coolant in the vicinity of the converter 632 inlet and outlet regions (e.g., the inlet 360 and the outlet 370 of FIG. 3) by allowing for a consistent coolant flow velocity at the surfaces of the containment structure (which are subject to thermal power deposition from the electron beam and must be cooled by the coolant fluid).

Referring specifically to FIG. 6, the converter 632 can minimize a flow length of the coolant, and therefore reduce the pressure drop, by putting a coolant flow direction parallel to the beamline. In such a configuration, the width of the converter 632 can be unrestrained by thermal performance. For example, in an embodiment, only 9 mm of porous tantalum can be used to stop 40 MeV electrons, which is shorter than a width of conventional converters that can be made to accommodate the FWHM from an accelerator. Moreover, reducing the flow length can also decrease the total temperature change of the coolant, thus increasing cooling efficiency. This concept can be seen in FIG. 8.

Figure 8:
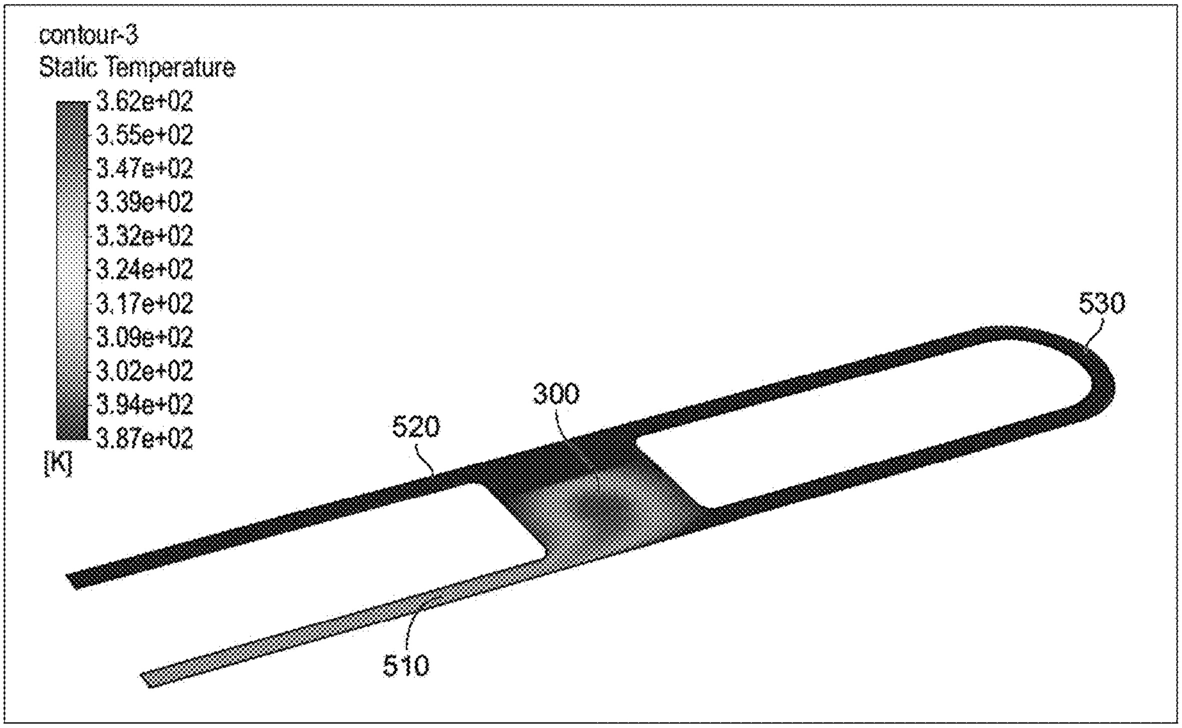
FIG. 8 illustrates a heatmap of the target region of FIG. 6 as the target region is subjected to electron beam bombardment.

As shown in FIG. 8, the photon flux produced by this model in MCNP [C. J. Werner, et al., "MCNP6.2 Release Notes", Los Alamos National Laboratory, report LA-UR-18-20808 (2018)] sees only a 3.7% drop in photon flux with 10-30 MeV energy compared to results from a model consisting of two solid tantalum converter disks similar to other academic papers' designs [Diamond, William & Ross, Carl. (2021). Actinium-225 production with an electron accelerator. *Journal of Applied Physics*. 129. 104901. 10.1063/5.0043509.].

Thus, the systems and methods disclosed herein can absorb and dissipate a high fraction of the beam power from a beamline and, in effect, shield a target from high thermal power deposition loads. This can alleviate the thermal design constraints on the target and add a passive safety function by placing the majority of the strain on the system on a non-radioactive component. Further, the target can be cooled via contact conduction cooling, rather than direct convection cooling in a fluid, as a benefit of the decreased thermal load on the target provided by the porous bed converter. This allows for simplified handling of the target and can reduce the risk that the accelerator cooling system becomes contaminated with target material by adding additional safety barriers to protect the system from causing groundwater contamination.

Each of the patents, patent applications and articles cited herein is incorporated by reference. The use of the article "a" or "an" is intended to include one or more.

The foregoing description and the examples are intended as illustrative and are not to be taken as limiting. Still other variations within the spirit and scope of this invention are possible and will readily present themselves to those skilled in the art.

Specific embodiments of a pebble bed beam converter according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:

1. A converter for an electron beam comprising:

a plurality of spherical beads disposed in a coolant fluid within the converter, wherein the converter is configured to accept the electron beam from a first side and to generate photons out a second side opposite from the first side.

2. The converter of claim 1, wherein the plurality of spherical beads are made of high atomic number (high-Z) material.

3. The converter of claim 1, wherein the plurality of spherical beads are packed and pseudo-randomly distributed within the converter.

4. The converter of claim 1, wherein the coolant fluid enters the converter from an inlet on the second side and exits the converter from an outlet on the first side.

5. The converter of claim 4, wherein a first screen is provided over the inlet and a second screen is provided over the outlet such that the plurality of spherical beads is contained within the converter through the first screen and the second screen.

6. A system for producing isotopes comprising:

an accelerator;

a beamline; and a target system comprising:

a porous media converter comprising a plurality of spherical beads; and a target;

an inlet designed to permit a flow of a coolant fluid to enter the porous media converter and surround the plurality of spherical beads; and an outlet designed to permit the coolant fluid to flow out of the porous media converter.

7. The system for producing isotopes of claim 6, wherein the accelerator is placed on a common axis with the target system.

8. The system for producing isotopes of claim 6, wherein the accelerator is placed on a first axis and the target system is placed on a second axis, different than the first axis.

9. The system for producing isotopes of claim 6, comprising a target cooling system in fluid communication with the target system.

10. The system for producing isotopes of claim 6, comprising a hot cell in fluid communication with the target system.

11. The system for producing isotopes of claim 6, comprising an accelerator vault designed to house the accelerator, the beamline, and the target system.

12. The system for producing isotopes of claim 11, comprising a first radiation zone located in the accelerator vault, the first radiation zone designed to house the accelerator and the beamline.

13. The system for producing isotopes of claim 11, comprising a second radiation zone located in the accelerator vault, the second radiation zone designed to house the target system.

14. The system for producing isotopes of claim 6, wherein the target system comprises a beamline window positioned in front of the porous media converter.

15. The system for producing isotopes of claim 6, wherein the target system comprises a passage designed to form a fluid passage between the inlet and the outlet to form a flow loop.

16. A method of converting an electron beam into a photon, the method comprising the steps of:

providing a converter having a plurality of spherical beads disposed in a coolant fluid;

bombarding the converter with one or more electron beams from a first side of the converter; and generating photons out of a second side of the converter opposite from the first side.

17. The method of claim 16, wherein the plurality of spherical beads are made of high atomic number (high-Z) material.

18. The method of claim 16, wherein the plurality of spherical beads are tightly packed and pseudo-randomly distributed within the converter.

19. The method of claim 16 further comprising:

providing the coolant fluid into the converter from an inlet on the second side; and allowing the coolant fluid to exit the converter from an outlet on the first side.

20. The method of claim 19, wherein a first screen is provided over the inlet and a second screen is provided over the outlet such that the plurality of spherical beads is contained within the converter through the first screen and the second screen.

* * * * *